US009610756B2

(12) United States Patent
Ashton et al.

(10) Patent No.: US 9,610,756 B2
(45) Date of Patent: Apr. 4, 2017

(54) RESIN IMPREGNATED MULTI ORIENTATION COMPOSITE MATERIAL

(71) Applicants: Larry J. Ashton, Mapleton, UT (US); Craig B. Simpson, Mapleton, UT (US); Rex W. Kay, Goshen, UT (US); Troy L. White, Goshen, UT (US); Mike Glen Allman, Spanish Fork, UT (US)

(72) Inventors: Larry J. Ashton, Mapleton, UT (US); Craig B. Simpson, Mapleton, UT (US); Rex W. Kay, Goshen, UT (US); Troy L. White, Goshen, UT (US); Mike Glen Allman, Spanish Fork, UT (US)

(73) Assignee: ROCKY MOUNTAIN COMPOSITES, INC., Spanish Fork, UT (US)

( * ) Notice: Subject to any disclaimer, the term of this patent is extended or adjusted under 35 U.S.C. 154(b) by 915 days.

(21) Appl. No.: 13/776,560

(22) Filed: Feb. 25, 2013

(65) Prior Publication Data
US 2013/0164491 A1 Jun. 27, 2013

Related U.S. Application Data

(63) Continuation of application No. 10/175,964, filed on Jun. 20, 2002, now abandoned, which is a
(Continued)

(51) Int. Cl.
*B32B 37/00* (2006.01)
*B29C 37/00* (2006.01)
(Continued)

(52) U.S. Cl.
CPC ...... *B32B 37/0038* (2013.01); *B29C 37/0064* (2013.01); *B29C 53/8066* (2013.01); *B29C 70/202* (2013.01); *B29C 70/32* (2013.01); *B29C 70/44* (2013.01); *B29C 70/443* (2013.01); *B29C 70/543* (2013.01); *B29C 70/546* (2013.01);
(Continued)

(58) Field of Classification Search
USPC .................................. 285/112; 138/125, 129
See application file for complete search history.

(56) References Cited

U.S. PATENT DOCUMENTS 2,843,153 A * 7/1958 Young .................. B29C 53/583
138/125
3,032,461 A † 5/1962 Baker
(Continued)

FOREIGN PATENT DOCUMENTS

GB 1410090 † 10/1975

*Primary Examiner* — Lynda Salvatore
(74) *Attorney, Agent, or Firm* — Nydegger & Associates (57) ABSTRACT

A composite material made of multiple filament bands is disclosed. The filament bands are wound to create a composite material. The filament bands may be impregnated with a solid or semi-solid resin. The filament bands are wound in multiple orientations to form a sheet of composite material. Additionally, the composite material may be made to have a varying number of layer and fiber orientations throughout the sheet of composite material. In another embodiment, a composite component requiring multiple layers and fiber orientations may be substantially manufactured during a filament winding process.

20 Claims, 6 Drawing Sheets

Related U.S. Application Data continuation-in-part of application No. 09/443,227, filed on Nov. 18, 1999, now Pat. No. 6,482,497.

(51) Int. Cl.

| | | |
|---|---|---|
| *B29C 70/20* | (2006.01) | |
| *B29C 70/32* | (2006.01) | |
| *B29C 70/44* | (2006.01) | |
| *B29C 70/54* | (2006.01) | |
| *B64C 3/20* | (2006.01) | |
| *D04H 3/04* | (2012.01) | |
| *D04H 3/07* | (2012.01) | |
| *D04H 3/12* | (2006.01) | |
| *B29C 53/58* | (2006.01) | |
| *B29C 53/66* | (2006.01) | |
| *B29C 53/80* | (2006.01) | |
| *B29L 31/30* | (2006.01) | |

(52) U.S. Cl.
CPC ............... *B64C 3/20* (2013.01); *D04H 3/04* (2013.01); *D04H 3/07* (2013.01); *D04H 3/12* (2013.01); *B29C 53/582* (2013.01); *B29C 53/66* (2013.01); *B29C 53/8016* (2013.01); *B29L 2031/3085* (2013.01); *Y02T 50/433* (2013.01); *Y10T 428/24116* (2015.01); *Y10T 428/24994* (2015.04)

(56) References Cited

U.S. PATENT DOCUMENTS

| | | | |
|---|---|---|---|
| 3,062,697 A † | 11/1962 | Novak | |
| 3,128,322 A * | 4/1964 | Young | B29C 70/44 162/181.2 |
| 3,282,757 A † | 11/1966 | Brussee | |
| 3,402,085 A † | 9/1968 | Trimble | |
| 3,770,042 A † | 11/1973 | Greene et al. | |
| 4,010,054 A † | 3/1977 | Bradt | |
| 4,053,081 A † | 10/1977 | Minke | |
| 4,309,473 A † | 1/1982 | Minamisawa | |
| 4,385,952 A † | 5/1983 | Futakuchi | |
| 4,869,761 A † | 9/1989 | Weingart | |
| 5,075,356 A † | 12/1991 | Crosby | |
| 5,176,868 A † | 1/1993 | Davis | |
| 5,330,820 A † | 7/1994 | Li | |
| 5,874,152 A * | 2/1999 | Middelman | B29B 15/122 156/166 |
| 6,221,295 B1 † | 4/2001 | Kaiser | |

\* cited by examiner
† cited by third party

RESIN IMPREGNATED MULTI ORIENTATION COMPOSITE MATERIAL

This application is a continuation of application Ser. No. 10/175,964, filed Jun. 20, 2002, which is now abandoned and which is a continuation-in-part of application Ser. No. 09/443,227, filed Nov. 18, 1999, which issued as U.S. Pat. No. 6,482,497. The contents of application Ser. No. 10/175,964 and U.S. Pat. No. 6,482,497 are incorporated herein by reference.

FIELD OF THE INVENTION

The present invention relates to composite materials. More particularly, the present invention relates to a composite material having multiple resin impregnated filament bands.

BACKGROUND OF THE INVENTION

Filament winding and composite materials have been a desirable substitute for metals and other materials in manufacturing applications. Composite materials have the advantages of being high strength, lightweight, and easily formable. Composite materials are comprised of a fiber, typically carbon, that is impregnated with a curable resin. Composite materials are often drapable like a fabric, allowing the uncured composite material to be formed into various shapes. Once the composite material is in the desired shape, the resin is cured and hardened to create a rigid structure.

Despite the many positive characteristics of composite materials, the overall cost of composite materials often makes their use impractical. Various factors affect the cost of composite materials. One factor is the number of manufacturing steps required in order to form a composite structure. Often manufacturing a composite material and forming the composite material into the desired shape requires multiple machines and extensive hand labor. For example, one method of creating a composite material is to weave fibers into a sheet of composite material. Weaving large sheets of carbon fibers can require expensive machines and can be a time intensive process.

Furthermore, impregnating a composite material with a resin adds additional steps to the process. These additional steps can involve impregnating entire sheets of composite materials with resins, creating difficulties in uniformly applying a resin to a large sheet of composite material. Additionally, these impregnating processes are often performed by different manufacturers at different locations, adding manufacturing and shipping costs at each step. As a result, the overall price of the composite materials for the end user can be high.

Another shortcoming of composite materials is the amount of hand labor required when assembling a composite structure. Often, multiple layers of composite materials are required in order to make a structure, and different orientations of composite materials are needed. In many current processes, each individual layer of composite material is laid up and oriented by hand onto a form or other shaping structure. The process of laying up and orienting individual sheets of composite material can add further expense and time to the already expensive and time-consuming manufacturing process.

Yet another problem with current composite materials is the handling of the resin impregnated composite material. In many applications the resin is made to have a low viscosity in order to allow resin to flow between the individual fibers of the material. The resin may be provided in a liquid form at ambient temperatures. While low viscosity resin allows for better permeation of the composite material, a low viscosity of liquid resin creates undesirable handling characteristics. Furthermore, the low viscosity resin does not effectively maintain the lay up of the composite sheet. Thus, the fibers may separate and fall apart when being handled or transported. Also, a low viscosity resin may flow away from certain sections of the composite material while being cured, leaving some areas with insufficient resin.

Therefore, what is needed in the art is an inexpensive composite material that eliminates the costs inherent in the composite manufacturing process. It would be an advancement in the art to provide a composite material impregnated with a resin that is solid or semi-solid at ambient temperatures. It would also be an advancement in the art to provide a composite material that is manufacturable in multiple layers and with multiple fiber orientations.

It would be another advancement in the art to provide a process that eliminates manual assembly steps in forming composite structures by creating a significant portion of a composite structure while manufacturing the composite material. Furthermore, it would be an advancement to provide a composite material that prevents the resin from uncontrollably transferring to objects that come in contact with the material or from flowing out of the uncured composite material. It would be another advancement in the art to provide a composite material with desirable tack and drape characteristics for forming the composite material into a desired shape. Such apparatuses and methods are disclosed and claimed herein.

SUMMARY OF THE INVENTION

The apparatus and method of the present invention have been developed in response to the present state-of-the-art, and, in particular, in response to problems and needs in the art that have not yet been fully resolved by currently available airbag systems. Thus, it is an overall objective of the present invention to provide an inexpensive composite material that is formable and capable of being rapidly manufactured.

The composite material may be comprised of a plurality of layers of filament bands wound to define a composite sheet. The composite bands may be made of any number of fibers, such as a carbon fiber. The filament bands are impregnated with a resin that is a solid or semi-solid at ambient temperatures. Ambient temperatures may encompass temperatures that are found in a manufacturing facility. The solid or semisolid resin may be heated to a viscous state in order to impregnate the filament bands.

The layers of filament bands may have multiple filament bands that are substantially parallel to one another. The layers of filament bands may be positioned on one another where alternating layers of filament bands have intersecting orientations. The intersecting orientations of adjacent filament bands may be substantially perpendicular to one another. Additional layers of filament bands may be added to define further layers of filament bands on a sheet of composite material.

The composite material may be wound onto a mandrel having various shapes. The mandrel may be drum shaped or be a more complex curved shape. In one winding application the composite material has been helically wound on a mandrel. The winding may be accomplished with a filament winding machine having a filament application section with a resin dispensing apparatus.

The filament bands may be at least about 0.5 inches wide. Other embodiments may include filament bands that are at least about 1 inch wide, while other filament bands may be no more than about 0.5 inches wide. The width and orientation of the individual bands may also vary throughout a sheet of material.

Generally, the process for manufacturing a composite material may be comprised of feeding a filament band from a filament distribution apparatus onto a mandrel. As the filament bands are being fed from the filament distribution apparatus, the filament bands are impregnated with a resin that is solid or semi-solid at ambient temperatures. Then the filament bands are laid on the mandrel in selective orientations and in a selective number of layers. The composite bands may be wrapped around a removable backing to prevent the semi-solid or solid resin from transferring to objects that come in contact with the material. The backing may be removed when the composite material is being applied to a form.

Multiple layers and orientations of the filament bands may exist in a composite material according to load requirements for a selected part or component, where the composite material is a pre-form. A pre-form is a part made of composite material where the features of the part are created during the winding process, thus eliminating laying up multiple layers of composite sheets. Different features in different locations of the parts may be created by varying the orientation and number of layers of the filament bands.

A pre-form may be manufactured by determining the load requirements for a composite component. The load requirements are based upon the design and the intended use of the component. Next, the number of layers and orientation of the filament bands needed in order to meet load requirements are identified. Then, a manufacturing control plan is created. Finally, the filament bands are wound according to the manufacturing control plan, laying the filament bands in the orientations and the layers for the load requirements of the component.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more detailed description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which.

DESCRIPTION OF THE PREFERRED EMBODIMENTS

The preferred embodiments of the invention are now described with reference to FIGS. 1-6, wherein like reference numbers indicate identical or functionally similar elements. The present invention, as generally described and illustrated in the Figures, may have a wide variety of configurations. Thus, the following more detailed description of the embodiments of the system and method of the present invention, as represented in the Figures, is not intended to limit the scope of the invention as claimed, but is merely representative of presently preferred embodiments of the invention.

The present invention includes a composite material providing several advantages in the art of composite materials. The composite material is relatively inexpensive and has a highly controllable manufacturing process. The composite material also has desirable drape and tack characteristics to allow for ease in forming the non-cured composite material into a desired shape or form. The composite material also provides for varying of the material characteristics of the composite material during a single line manufacturing process.

Referring now to FIGS. 1A-H, a process for manufacturing a sheet of composite material is illustrated. A sheet of composite material 100, shown completed in FIG. 1H, is manufactured with multiple layers of filament bands 110 laid out in alternating orientations. In one embodiment, a filament band 110 is comprised of multiple strands of various fibrous materials. The materials may include carbon fiber, fiberglass, Kevlar, silicon carbide, or other fibrous materials. The filament bands 110 may include other smaller bands of fibrous materials merged together to create a large or wide filament band 110. Alternatively, multiple smaller bands of varying composite materials may be used to create a large filament band 110 made of multiple fibrous materials. Such a combination of fibrous materials would create a filament band 110 that is optimized to manifest material characteristics of the combined fibrous materials.

Generally, an increased number of fibers in a band 110 will correspond to an increased width or thickness of the filament band 110. The width and thickness of the filament band 110 of a fixed number of fibrous strands may be controlled by processing the band 110 through a series of idler rods or tension controlling devices. The idler rods or tension controlling devices may spread the filament band 110 to create a wider thinner filament band 110.

The filament bands 110 may be wound into a composite material 110 through various filament band 110 laying procedures. FIGS. 1A-H illustrate one process of creating a composite material 100 through a filament winding or layering process.

Figure 1:
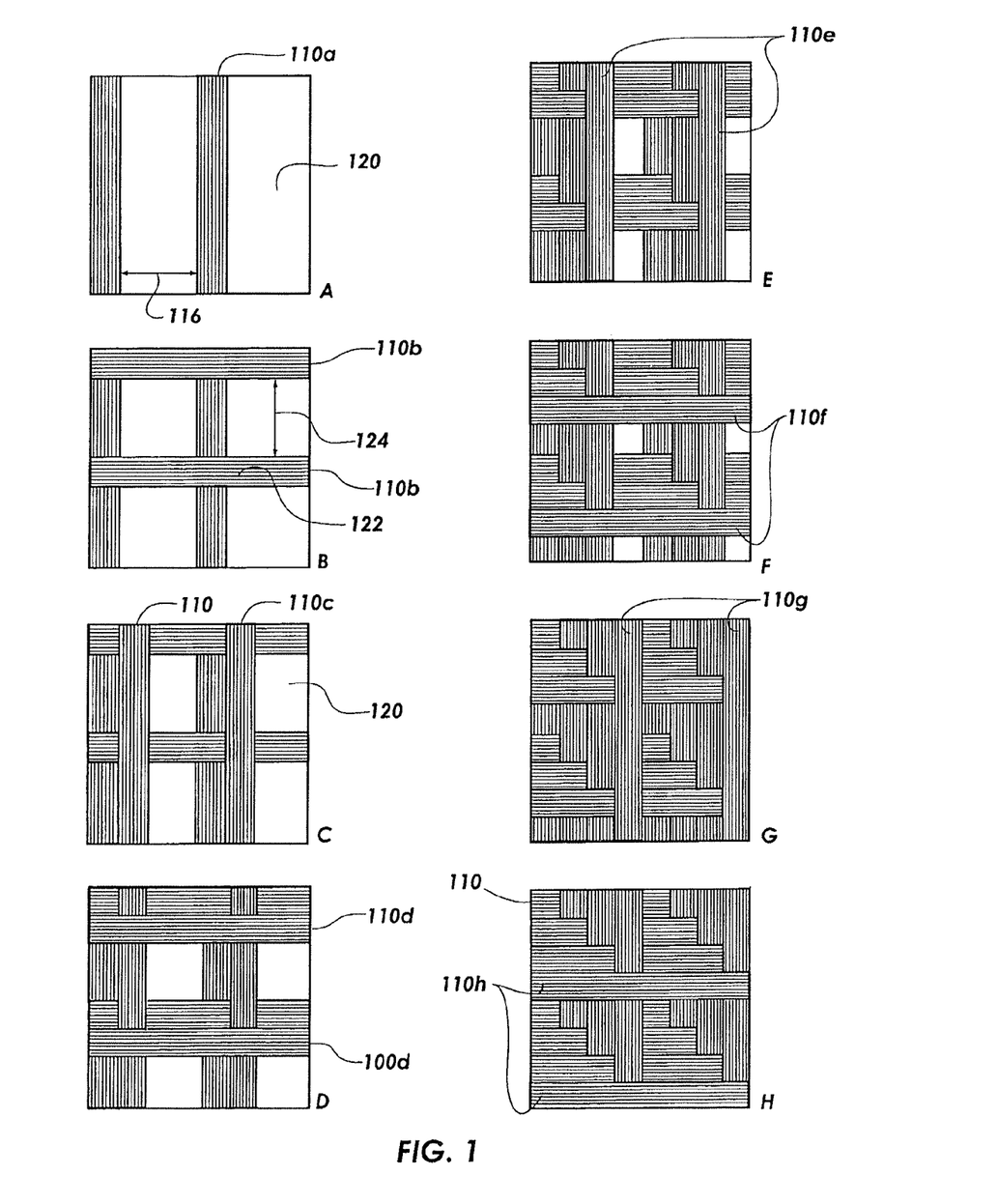
FIGS. 1A-H are top views of the process of manufacturing a composite material.

The composite material 100 of FIG. 1 may be comprised of multiple layers of filament bands 110 laid out on one another. An individual layer may comprise multiple filament bands 110 that are substantially parallel, where individual bands 110 are positioned relative to one another at spaced distances. In FIGS. 1A-H, the individual figures represent the placement of a layer of filament bands 110.

FIG. 1A depicts a layer comprising two filament bands 110a being placed on a surface 120 in a first orientation, where the surface 120 may be a mandrel, drum, table, or other surface. In FIG. 1A, the first orientation is shown as being vertical. However, this orientation is only shown for illustrative purposes. The two parallel filament bands 110a of the first layer are positioned at a horizontal spaced distance 116. In the composite material 100, illustrated in FIG. 1A, the vertical filament bands 110a have a horizontal spaced distance 116 that is equal to the width of three filament bands 110. In such an embodiment, three layers of filament bands 110 placed side to side will be required to form a complete sheet of composite material 100.

Once the first layer of filament bands 110a is placed on the surface 120, a second layer of filament bands 110b is placed upon the first layer of filament bands 110a. The filament bands 110b of the second layer are also substantially parallel to one another and are positioned at a vertical spaced distance 124. The vertical spaced distance 124 of the second layer of filament bands 110b may be equal to the horizontal spaced distance 116 of the first layer of filament bands 110a. Alternatively, the vertical spaced distance 124 may be different than the horizontal spaced distance 116. However, when the vertical spaced distance 124 and the horizontal spaced distance 116 are the same, an equal number of layers in each orientation can be used to create a uniform sheet of composite material 100.

Furthermore, the spaced distance of any layer of the filament bands 110 may vary within a single layer. For example, a layer may comprise four filament bands (not shown) where three spaced distances separate the four filament bands. The three spaced distances might each be different within a single layer of filament bands. Such an embodiment may be desirable where additional filament bands are required to strengthen portions of the composite material or in a pre-form application, which will be discussed later.

Independent of the spaced distances 116, 124 of the filament bands 110a, 110b, the second layer of filament bands 110b is placed on the first layer of filament bands 110a. The second layer of filament bands 110b is positioned on the first layer of filament bands 110a such that the second layer of filament bands 110b has an intersecting orientation with the first layer of filament bands 110a. The intersecting orientation of the first layer of filament bands 110a and the second layer of filament bands 110b may have a wide range of relative angles.

In FIG. 1B, the relative angles of the filament bands 110a of the first layer to the filament bands 110b of the second layer are at a 90° offset. However, different relative angles between alternating layers of filament bands 110 may be possible. In one embodiment, the relative angle of the layers of filament bands 110 is such that a single filament band 110b from the second layer intersects and overlaps a majority of the filament bands 110a from the first layer on a sheet of composite material 100.

For example, FIG. 1B illustrates an intersecting angle where a single filament band 110b intersects all of the filament bands 110a of the first layer. However, if the relative intersecting angle between the two layers of the filament bands 110a, 110b was approximately 10° or less, then a single filament band 110b of the second layer may only intersect a single filament band 110a from the first layer.

Referring now to FIG. 1C, a third layer of filament bands 110c is placed on top of the second layer of filament bands 110b. The third layer of filament bands 110c is placed on top of the second layer of filament bands 110b in an intersecting orientation. The orientation of the third layer of filament bands 110c may be substantially equal to the orientation of the first layer of filament bands 110a. However, the filament bands 110c of the third layer may be placed at a location on the surface 120 adjacent to the filament bands 110a of the first layer, such as illustrated in FIG. 1C.

Similarly, a fourth layer of filament bands 110d may be laid on the third layer of filament bands 110c in the same orientation as a second layer of filament bands 110b. Subsequent layers of filament bands 110e, 110f, 110g, 110h may be placed on one another in alternating orientations to form a sheet of composite material 100, as illustrated and FIG. 1H.

FIGS. 1A, C, E, G and Figures B, D, F, H show subsequent layers of filament bands 110 having similar intersecting angles as being placed adjacent to previously laid filament bands 110. However, subsequent layers of filament bands 110 need not necessarily be adjacent to previously laid layers of filament bands 110. Subsequent filament bands 110 may overlap previously laid filament bands 110. Alternatively, subsequent filament bands 110 may have a gap between previously laid filament bands 110.

While the spacing between subsequent filament bands 110 may vary, it may be preferred for subsequent filament bands 110 to substantially align to previously laid filament bands 110 in a sequential manner, such as illustrated in FIG. 1C. This embodiment prevents openings or windows from forming in the sheet of composite material 100.

Additionally, the alignment as illustrated in FIGS. 1A-H provides for a uniform distribution of filament bands 110. By providing filament bands 110 with uniformly spaced distances within a single layer and between layers, a composite material 100 with a substantially constant thickness may be provided. In the embodiment illustrated in FIGS. 1A-H, the thickness of the composite material 100 is equal to the thickness of two of the filament bands 110. This occurs because any given section of the surface 120 is covered by only two filament bands 110 with different orientations.

This may be best understood by viewing an overlapping location 122 indicated in FIG. 1B. The overlapping location 122 is created by a filament band 110b of the second layer overlapping a filament band 110a of the first layer. This overlapping location 122 has a thickness equal to the thickness of the two filament bands 110a, 110b which comprise the overlapping location 122. By viewing the subsequent FIGS. 1C-H, it can be seen that no further filament bands 110c-h are placed upon the overlapping location 122. For this embodiment, the same will be true for any other given sections of the composite material 100, where each section of the composite material 100 is comprised of two filament bands 110 with different fiber orientations.

Multiple variations of the structure of the composite material 100, other than that illustrated in FIG. 1, may be achieved. For example, the orientations of the filament bands 110 in a single layer may also vary along the length of the composite material 100. In FIG. 1A, the two filament bands 110a of the first layer are illustrated as parallel to one another. However, the two filament bands 110a of the first layer may have any number of angled orientations relative to one another, such as if one filament band 110 was vertical and a second band was at a 30° offset. Similarly, the filament bands 110 in other layers may vary in the same manner as has been described above.

Furthermore, the illustration of vertical filament bands 110a and horizontal filament bands 110b in FIGS. 1A-H are only one embodiment of the orientation of filament bands 110 possible with the composite material 100. The filament bands 110 may have multiple other orientations, thicknesses, and layers depending upon the desired structure of the composite material.

Another feature of the present composite material 100 is the use of filament bands 110 impregnated with a resin before the sheet of composite material 100 is manufactured. The individual filament bands 110 may be pre-impregnated with a resin that is in a solid or semi-solid state at ambient temperatures. In one embodiment, the resin may remain solid at temperatures up to about 120° F. The resin may include different epoxies and hardeners, such as a phenolics and bisphenols that become liquid at a temperature of about 160° F.

However, various other epoxies are presently available that are solid or semi-solid at ambient temperatures and are suitable for composite material 100 applications. Generally, the resin should be selected such that the resin remains solid or semi-solid at ambient conditions in which the composite material 100 will be handled and assembled. The temperature range may include temperatures that may be common in a manufacturing facility, where ambient temperatures are between about 50° F. to 110° F., and may preferably be about 70° F.

Additionally, the resin should be selected such that the resin remains in a solid or semi-solid state when the composite material 100 comes in contact with items in a manufacturing facility that are warmer than ambient air temperatures. For example, tools, forms, and assembly surfaces may have increased temperatures due to friction, radiant heat, or other factors.

The resin should also remain in a solid or semi-solid state during transportation and shipping. Often, the shipping of materials occurs in trucks or shipping containers without temperature regulation systems. The temperatures within the trucks and shipping containers can exceed 100° F. If the resin becomes a viscous liquid during transportation and shipping, resin may flow out of the material, leaving some sections with an inadequate quantity of resin. Therefore, the resin should be selected such that the resin remains solid or semi-solid at these relatively high temperatures.

By providing a resin that remains solid or semi-solid through a large range of ambient temperatures, the impregnation of resin within the fibers will remain substantially uniform. A uniform impregnation of resin will prevent the creation of weakened sections within the composite material 100 caused by an insufficient quantity of resin.

In order to impregnate the filament bands 110 with a solid or semi-solid resin, the resin must be placed in a state where it can be easily impregnated into a filament band 110. In one application, the resin that is provided in a solid or semi-solid state at ambient temperatures is heated into a liquid or viscous liquid state. The heated viscous resin may then be impregnated into the individual filament bands 110. After the liquid resin is impregnated into the filament bands 110 the resin cools into a solid or semi-solid state.

The filament bands 110 may be comprised of multiple smaller filament bands that are merged together to create a generally large filament band 110. Either the large filament band 110 or the smaller filament bands which make up the large filament band 110 may be impregnated. It may be advantageous to minimize the number of fibers that are impregnated at a single time. By minimize the number of fibers, each fiber may be more easily and uniformly impregnated with the heated resin.

Impregnating the individual filament bands 110 with resin before the filament bands 110 are formed into a sheet of composite material 100 provides several manufacturing and design advantages. One advantage is the ability to eliminate the step of impregnating a completed sheet of composite material 100 or otherwise coating the wound composite material 100 with the resin. Often, impregnating an entire sheet of composite material requires a large bath of liquid resin. A bath of liquid resin requires the use of a large quantity of resin that is not used and that has a potential of receiving contaminants. Also, immersing a sheet of composite material into a liquid resin bath does not allow the quantity of resin that is impregnated into the composite material 100 to be controlled.

Impregnating the filament bands 110 with resin before they are wound into a sheet of composite material 100 allows for the application of a sufficient quantity of resin between the different layers of the filament bands 110. During the assembly process of the filament bands 110, layers of individual filament bands 110 are generally laid upon one another, as illustrated in FIGS. 1A-H.

For example, in FIGS. 1A and 1B the second layer of filament bands 110b is laid upon the first layer of filament bands 110a. By laying the two layers of filament bands 110a, 110b on one another, an overlapping location 122 is created. If the filament bands 110a, 110b are not pre-impregnated with the resin, an insufficient and ineffective quantity of resin may be present between the filament bands 110a, 110b of the two layers. However, filament bands 110 that are pre-impregnated with a resin will have an effective and sufficient quantity of resin in the overlapping locations 122. An effective quantity of resin is a quantity that is capable of providing a uniform distribution of resin throughout the composite material 100. By having an effective and sufficient quantity of resin between the various layers, a stronger and more uniform composite material 100 will be formed.

Another advantage of pre-impregnating the filament bands 110 with a resin, that is solid or semi-solid at ambient temperatures, is the tacky characteristics of a solid or semisolid resin. The tack of the resin will allow the individual filament bands 110 to stick to one another. As was illustrated in FIGS. 1A-H, a sheet of composite material 100 is comprised of multiple individual filament bands 110 that are selectively positioned. The tack of the resin impregnated filament bands 110 allows the filament bands 110 to adhere together, to form a sheet of composite material 100 that may be easily handled.

Furthermore, the individual filament bands 110 are comprised of smaller quantities of fibers. The use of the tacky resin prevents the individual filament bands 110 from separating into numerous fibers. Thus, a generally large sheet of composite material 100 may be formed without the need for weaving, sewing, or otherwise holding the sheet of composite material 100 together.

The tack of the solid or semi-solid resin also provides advantages when placing the composite material 110 onto a form to be cured. Typically, a composite material 100 is formed by placing a sheet of uncured composite material 100 on to a form to define a shape. As the composite material 100 is cured, the composite material 100 will maintain the shape of the form to which it is attached. The tack allows the composite material 100 to adhere to the form without the need for any attachment mechanisms to hold the composite material 100 to the form.

Furthermore, the tack of the composite material 100 created by the solid or semisolid resin allows the composite material 100 to easily attach to other pieces of composite material 100. Often, a composite structure is created by joining multiple pieces of composite material 100 together. The tack of the resin allows separate pieces of composite material 100 to be adhered together, such that proper contact is maintained during curing.

The amount of tack of the composite material 100 will depend upon the type of solid or semi-solid resin used. The tack may also be a function of the temperature of the resin in the composite material 100. It may be preferable for the tack of a sheet of composite material 100 be sufficient to maintain its own weight on a vertical or inverted surface.

Figure 2:
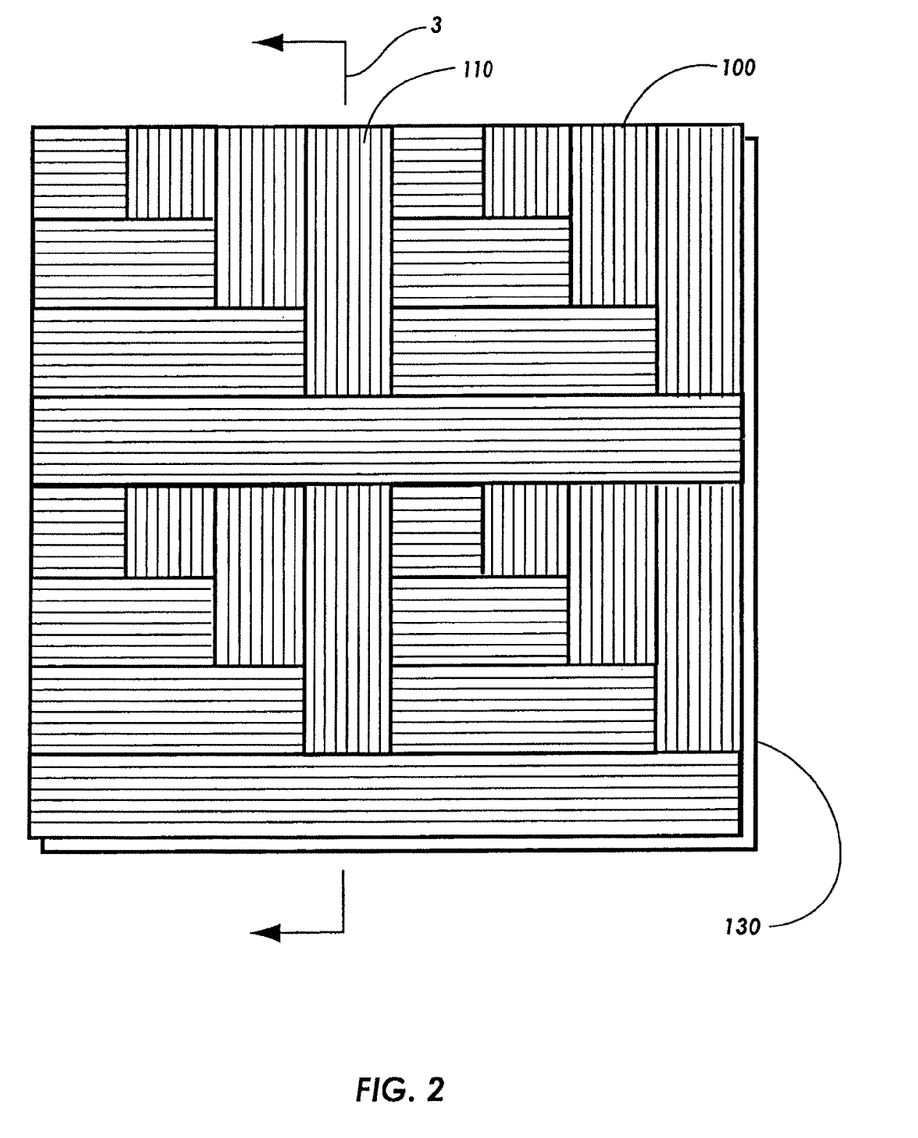
FIG. 2 is a top view of a composite sheet manufactured with in the scope of the present invention.

In order to provide convenience in shipping and handling of the tacky composite material, a removable backing 130, as illustrated in FIG. 2, may be added to the composite material 100. A removable backing 130 may be a plastic or other similar type of material that creates a buffer between the tacky resin and other objects. The removable backing 130 may be placed on both sides of the composite material 100 in order to prevent the tacky resin from adhering to objects that the composite material 100 comes in contact with. Also, the removable backing 130 prevents resin from transferring to surrounding objects.

The removable backing 130 and the tack may provide a useful combination of features when applying the composite material 100 to a form. When applying the composite material 100 to a form, one side of the removable backing 130 may be removed to expose the tacky composite material 100. The composite material 100 may then be handled by the side of the composite material having the remaining removable backing 130. The exposed tacky composite material 100 may be adhered to a form by pressing on the removable backing 130 of the opposing side. Once the composite material 100 is in place, the second side of removable backing 130 may be peeled off from the composite material 100.

Figure 3:
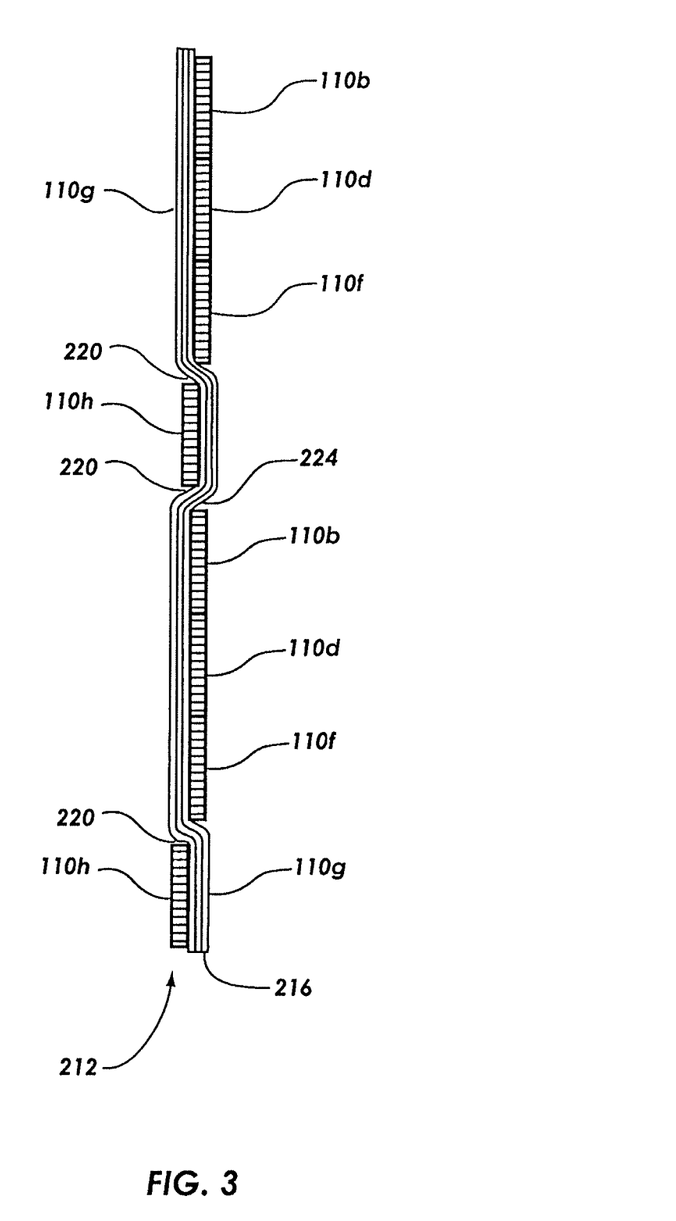
FIG. 3 is a cross-sectional view of the sheet of composite material of FIG. 2.

Referring now to FIG. 3, a cross-sectional view of the sheet of composite material 100 of FIG. 2 is illustrated. The cross-sectional view shows multiple layers of filament bands 110a-h forming a sheet of composite material 100. The composite material 100 has a uniform thickness equal to the thickness of two filament bands 110. The uniform thickness creates a composite material 100 having a top layer 212 and a bottom layer 216. Both the top layer 212 and bottom layer 216 are made of filament bands 110 from multiple layers.

The relative positioning and lengths of the multiple layers of filament bands 110 provide significant strength advantages. Composite materials 100 receive their strength by combining fibers having a high tensile strength with a resin having a high compression and bending resistance. While the resin can withstand a substantial tensile force, it is preferable for the fibers to be loaded with a tensile force instead of the resin. An optimally designed composite material 100 will be configured such that the fibers are substantially loaded with tensile forces and the resin is substantially loaded with compressive and sheer forces. Thus, features of the composite material 100 which do not optimally load either the fibers or resin should be avoided.

One feature of the composite material 100 that maybe desirable to avoid is the locations where the filament bands 110g transition between the top layer 212 and the bottom layer 216. The transitioning of the filament band 110g from the upper layer 212 to a lower layer 216 is referred to as a crimping section 220.

For example, the filament band 110g of the seventh layer is illustrated in FIG. 3. Viewing FIG. 3 from the right to left, the filament band 110g of the seventh layer is located on the top layer 212 of the composite material 100. The filament band 110g of the seventh layer is positioned on top of three filament bands 110b, 110d, 110f, of other layers. The filament band 110g of the seventh layer then crimps under a filament band 110h of the eighth layer. After crimping under the filament band 110h of the eighth layer, the filament band 110g of the seventh layer transitions from the bottom layer 216 to the top layer 212. The locations where the filament band 110g transitions from the top layer 212 to the bottom layer 216 and then back again to the top layer 212 creates two crimping sections 220 at each transition location.

The crimping sections 220 introduce vacancies 224 into the composite material 100 where the filament band 110 transitions between the top layer 212 and the bottom layer 216. The resin that is impregnated in the filament bands 110 may fill the vacancies 224 with resin. Thus, when the filament bands 110 are loaded with a tensile force, a portion of the tensile force will be transferred to the resin filled vacancies 224. Because the fibers of the filament bands 110 are typically stronger than the resin, the resin filled vacancies 224 may reduce the strength of the material 100.

While the crimping sections 220 may introduce vacancies 224 into the composite material 100, a selective amount of crimping sections 220 provide some of advantages to the composite material 100. The crimping sections 220 allow the filament bands 110 of the top layer 212 and the bottom layer 216 to intertwine. If the composite material 100 is comprised of only two layers of filament bands 110 with no crimping sections 220, then the strength of the composite material 100 would only be equal to the strength of the resin holding the two layers together. However, the selective use of crimping sections 220 allows the top layer 212 and the bottom layer 216 to be connected together by the filament bands 110.

The composite material 100 disclosed herein provides a minimal number of crimping sections 220. As can be seen in FIG. 3, the filament band 110g of the seventh layer is positioned substantially on the top layer 212 with two small crimping sections 220. By providing the generally long sections of the filament bands 110 that are on a single layer of the composite material 100, a tensile load on the filament bands 110 will be placed upon the straight fibers of the filament band 110.

Referring back to FIG. 2, an inspection of the composite material 100 illustrates that a majority of the filament bands 110 have straight sections of fiber without crimping sections that are at least three times the width of the filament bands 110. Additionally, selective filament bands 110 have no crimping sections 220. While the ratio of length of the filament bands 110 to the width is noted for illustrative purposes only, it does demonstrate the advantages of the composite material 100 in maximizing the straight sections of filament bands 110, while still employing a minimal number of crimping sections 220.

Figure 4:
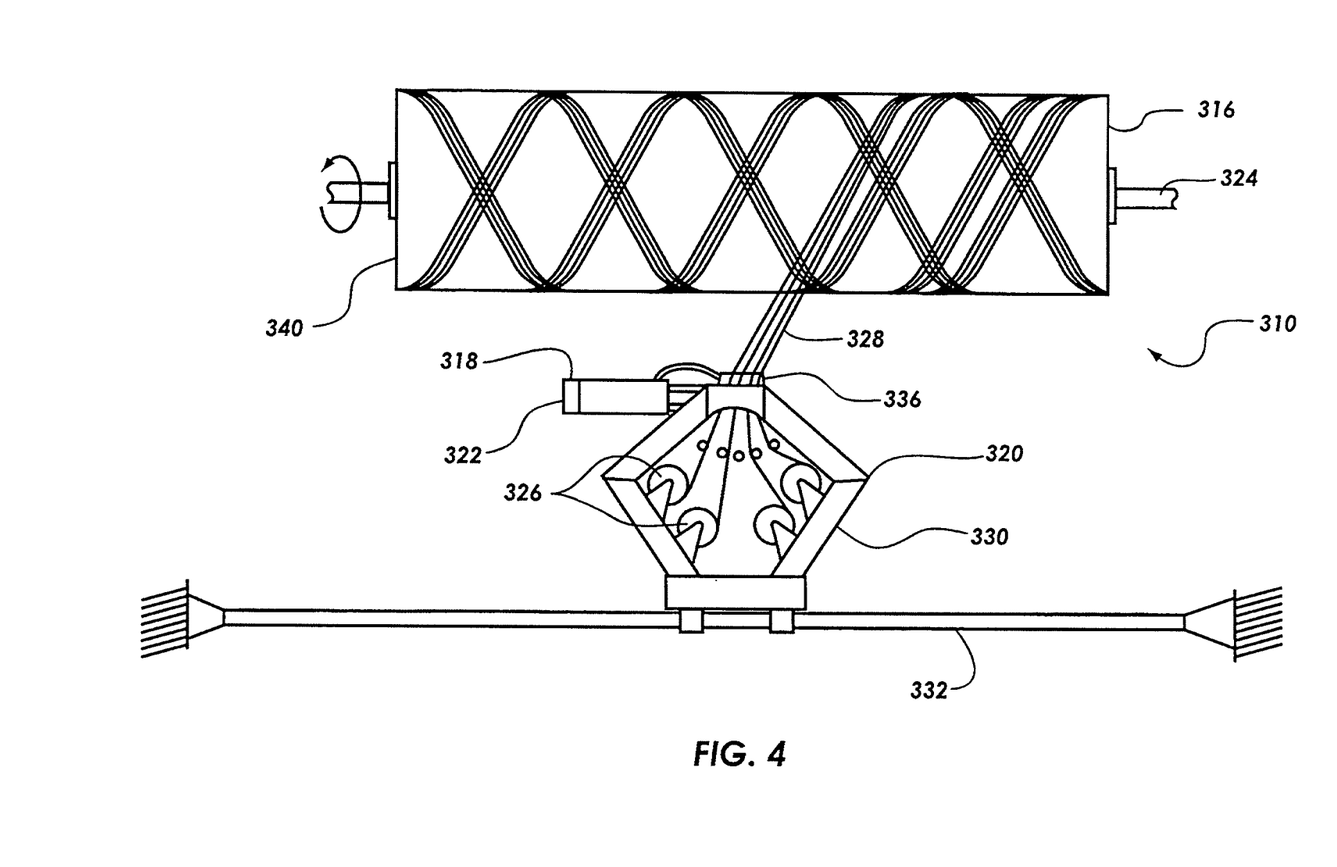
FIG. 4 is a top view of a filament winding machine winding a sheet of composite material within the scope of the present invention.

Methods for manufacturing the composite material 100 may include filament winding as well as laying out the individual filament bands 110. Referring now to FIG. 4, a filament winding machine 310 is illustrated. The filament winding machine 310 is provided to apply the filament bands 110 to a mandrel 316 or other similar structure. The filament winding machine 310 is comprised of a mandrel 316, a filament application section 320, and a transport system 330.

The filament winding machine 310 is configured to wind spools of fiber 326 on to a mandrel 316 to form a sheet of composite material 100. The filament winding machine 310 may also include a resin source 318 that provides a supply of resin to impregnate the filament band 328 with a resin before the filament band 328 is wound onto the mandrel 316. As mentioned previously, the resin source 318 may be attached to a heating unit 322 in order for the resin to be heated to a liquid state so that the resin may be impregnated into the filament band 328.

The filament band 328 is wound onto a mandrel 316. The mandrel 316 may be a large rotating drum or other similar device that will allow the application of filament bands 328 that are pre-impregnated with a resin. In one embodiment, the mandrel 316 is configured to rotate about an axle 324, such that the mandrel 316 draws the filament band 328 from the filament application section 320.

The filament application section 320 may be comprised of one or more filament sources, such as filament spools 326, to provide a source of fibers in order to create the filament band 328. The spools 326 may provide a source of filament fibers in order to create a filament band 328, or alternatively the spools 326 may provide multiple smaller filament bands that are merged into a single large filament band 328.

The filament application section 320 may be configured to translate relative to the mandrel 316. The translation may be achieved by attaching the filament application section 320 to a transport system 330. In one embodiment, the transport system 330 may be a track 332 on which the filament application section 320 may ride. One having ordinary skill in the art, will recognize that multiple other systems may be provided to allow the filament application section 320 to translate relative to the mandrel 316.

The spools 326 may be attached to the filament application section 320, such that the spools 326 translate with the filament application section 320. However, the spools 326 may be situated on a stationary device, where the spools 326 feed the translating filament application section 320 from the stationary location. While attaching the spools 326 to the filament application section 320 may provide for a more simple feeding mechanism, the amount of fiber that may be maintained on the spools 326 may be limited to a small amount. Thus, in filament winding applications of large sheets of composite material 100, it may be advantageous to provide large quantities of fibers on spools 326 not attached to the filament application section 320.

The motion of the filament application section 320 relative to the mandrel 316 may be an automated or manual motion controlling system. The motion controlling system may control the transitional motion of the filament application section 320 as well as the angle on which the filament band 328 is applied to the mandrel 316. While both a manual and an automated system are possible, an automated system may be the most practical for winding large sheets of composite material 100.

The filament application section 320 may also include a plurality of idler rods (not shown) which control the characteristics of the filament band 328. For example, the idler rods may place the filament band 328 in tension to change the width of the filament band 328. A single filament band 328 may feed through multiple idler rods before being applied to the mandrel 316.

Controlling the width of the filament band 328 provides several advantages in the winding of a sheet of composite material 100. By widening a filament band 328, the thickness of the filament band 328 may be reduced, and by providing a narrow filament band 328 the thickness may be increased. Thus, the thickness of the filament band 328 may be controlled by a widening of the filament band 328 through idler rods or other similar devices.

Another advantage in providing a generally wide filament band 328 is the decreased manufacturing time needed to create a sheet of composite material 100. A sheet of composite material 100 is formed by wrapping the filament band 328 around the mandrel 316 until the mandrel 316 is substantially covered. By using a wide filament band 328, the number of rotations required to cover the mandrel 316 may be reduced. In one embodiment, the filament band 328 may be 0.5 to 1.0 inch in width. However, other embodiments may employ a filament band 328 that is less than 0.5 inches wide or that is larger than 1 inch wide.

The application of the filament band 328 may also be controlled by the filament winding head 336. The filament winding head 336 may be configured to control the angle at which the filament band 328 is applied to the mandrel 316. The filament winding head 336 may be capable of varying the angle of the filament bands 328, while winding a single layer of filament bands 328. The filament winding head 336 may include the idler rods as well as a resin application system for impregnating the filament bands 328 with a resin.

The varying control systems of the filament winding machine 310 allows for a large degree of control over the features and characteristics of a sheet of composite material 100. Thus, a single machine may be employed to create multiple embodiments of the composite material 100.

The winding process may be accomplished by attaching an end of the filament band 328 to a location on the mandrel 316, such as the end 340. The filament band 328 may be attached to the mandrel 316 by an adhesive tape or by the tack of the pre-impregnated filament band 328. Attaching the end of the filament band 328 to the end 340 of the mandrel 316 may be useful in determining the starting and stopping point for the winding process. However, the end of the filament band 328 may be attached to any location on the mandrel 316.

In a composite material 100 employing a removable backing 130, the removable backing 130 will first be mounted on the mandrel 316 before attaching the filament band 328 to the mandrel 316. In this embodiment, the end of the filament band 328 would be attached to the removable backing 130. By winding the filament bands 328 on to the removable backing 130, the sheet of composite material 100 may be removed from the mandrel 316 with at least one side of the composite material 100 covered with a removable backing 130.

Once the filament band 328 is attached to the mandrel 316, the mandrel 316 may be rotated to draw the filament band 328 from the filament application section 320. As the filament band 328 is drawn from the filament application section 320, the transport system 330 translates relative to the mandrel 316. By varying the rotational speed of the mandrel 316 and the translation speed of the transport system 330, the manner in which the filament band 328 is applied to the mandrel 316 may be controlled.

The control of the rotation of the mandrel 316 and the translation of the transport system 330 can determine the spaced distance, the angle of the filament band 328, the intersecting angle of the different layers of filament bands, and the relative position of the various layers. These features of the composite material 100 may remain constant throughout a single sheet of composite material 100 or may change throughout a single sheet of composite material 100.

For example, the filament band 328 may be laid out at a first angle or orientation during the initial winding passes around the mandrel 316. The angle of the filament band 328 may then be changed to a second angle during the central winding passes around the mandrel 316. The angle of the filament band 328 may then returned back to the angle during the initial rotations of the filament band 328 around the mandrel 316.

The ability of the filament band 328 to change its angle during a single pass across the mandrel 316 is possible due in part to the tack of the composite material 100. The tack of the resin will allow the filament band 328 to adhere to the mandrel 316 and maintain the angle in which it was placed on the mandrel 316. Furthermore, when the angle is abruptly changed, the tack of the filament band 328 will prevent the previously laid section of filament band 328 from conforming to the new angle of the filament band 328.

Similarly, the spaced distance between the filament bands 328 may also be varied during manufacturing of the composite material 100 in the same manner as the angle of the filament band 328. Additionally, the angle of the filament band 328 as well as the spaced distance of the filament band 328 may be change from layer to layer.

Figure 5:
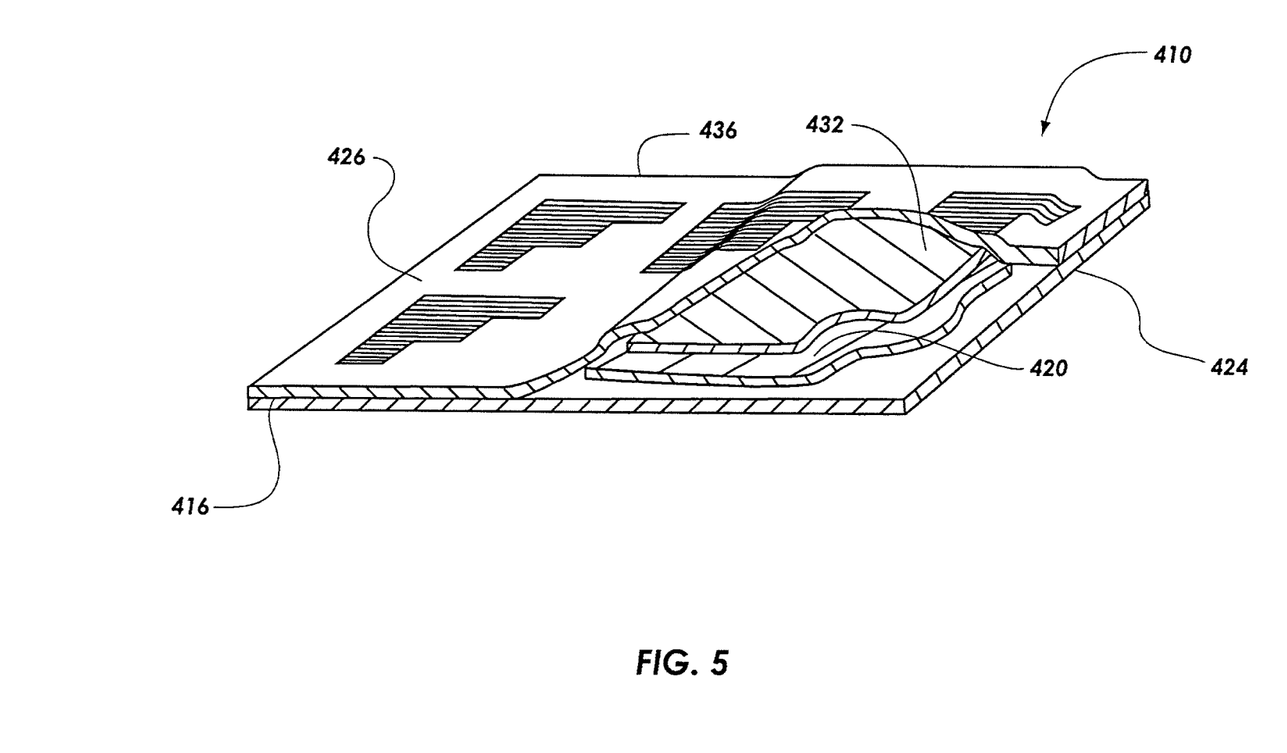
FIG. 5 is a cross-sectional perspective view of a multi-layer composite material.

Referring now to FIG. 5, a section of multilayer composite material 410 is illustrated. The multilayer composite material 410 has a varying number of layers across its length. The multilayer composite material 410, may be similar to a composite material that has been laid out by hand in different layers. However, the composite material 100 illustrated in FIG. 2, is wound in multilayer sections during a single winding process, and has a varying number of layers across its length.

The varying number of layers may be achieved by applying multiple layers of filament bands in differing orientations and at different locations. The orientations and layers may be controlled during the filament winding process on the mandrel 316, as discussed above. For example, the filament winding machine 310 may wind a first layer 416 comprising two groups of filament bands laid out in different orientations, such as illustrated in FIG. 2. After the first layer 416 is formed, portions of a second layer 420 may be laid out on top of selected portions of the first layer 416, such as is illustrated in FIG. 5.

In one embodiment, the orientation of the fibers of the filament bands of the second layer 420 are in a different orientation than the orientation of the filament bands in the first layer 416. The difference in orientations may be desirable for the second layer 420 to receive a load in a different direction than would be desirable for the fibers in the first layer 416. Next, a third layer 432 may be placed upon the second layer 420 to receive a load in yet another direction.

Additionally, a top layer 436 may be placed upon the entire piece of composite material 410. The top layer 436 may function to provide even transitions between the single layer sections and the multilayer sections of the composite material 410. Furthermore, the angle and orientations of the fibers and the filament bands in the three layers 416, 420, 432 may be in a substantially similar direction. The number of layers in a composite material 410 will depend upon the desired application. The use of multiple layers having filament bands with different orientations allows a composite material 410 to be designed for certain components without the necessity of manually laying out multiple layers of composite material.

One application for a multilayer composite material 410 having differently oriented fibers throughout the composite material 410 is the manufacture of a pre-form. A pre-form is a composite component or part where at least a portion of the structure is manufactured during the manufacture of the sheets of composite material 100. By creating piece of composite material that has the layers and orientations of a ready-to-be cured component, the process of hand laying multiple sheets of composite materials can be avoided.

Currently, most composite materials are manufactured without a view of the end product to be made of the composite material. Typically, generic composite materials of different thicknesses, strength characteristics, and fiber orientations are manufactured. From the generic supply of composite materials, end products are manufactured by laying up multiple layers of the manufactured composite materials in the desired shape and layers. The process of manually laying out composite materials adds to the cost of the overall part.

Figure 6:
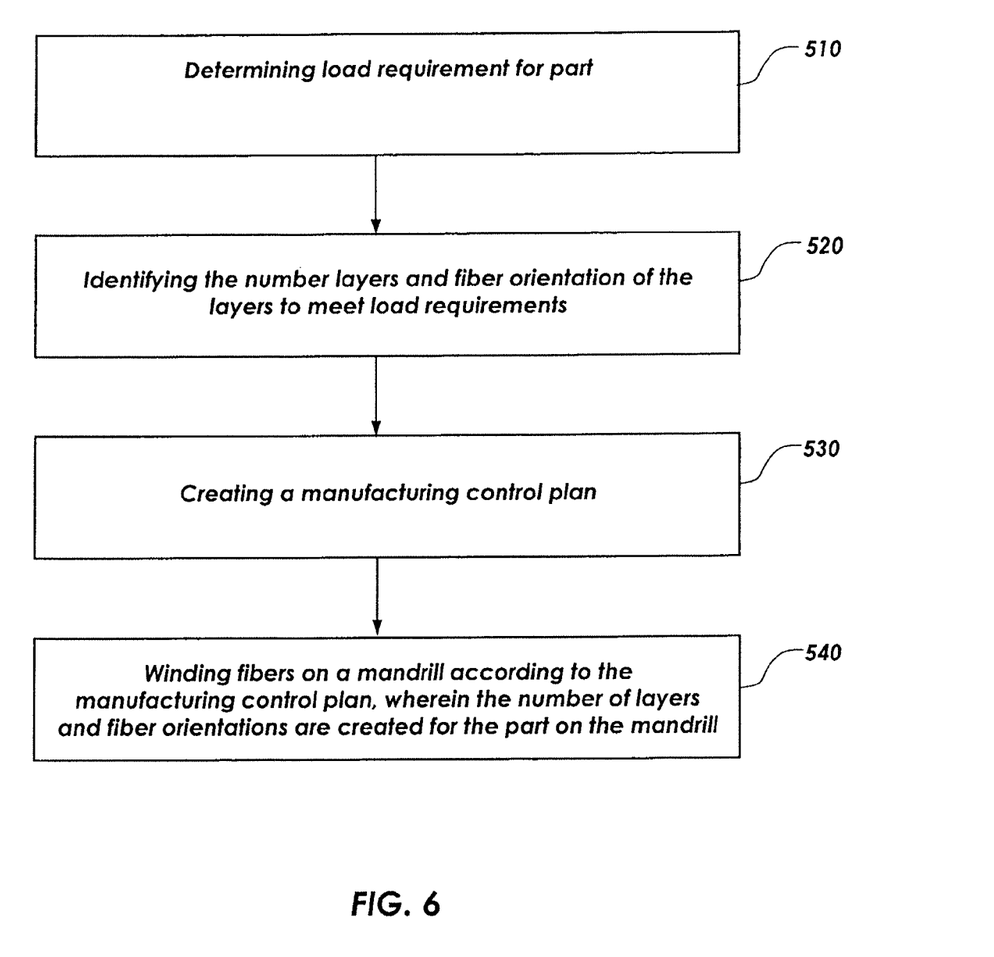
FIG. 6 is a pre-form manufacturing process flow diagram.

In order to avoid manually laying up the composite materials to form a component, the multiple layers of composite material may be created on one another when the composite material is manufactured. To accomplish this, the design of the component or part must be known before the composite material is manufactured. Referring now to FIG. 6, a flow diagram illustrating the steps in creating a pre-form is shown.

First, the load requirements for the end part or component are determined 510. The load required will depend upon the application and the loads that are intended to be placed upon the part. The part may require sections of increased thickness to receive a large load or may require locations for attachment of other components that cannot be created when the composite material is being manufactured.

Once these load requirements are known, the number of layers and orientations of the filament bands will be determined in order to meet the specifications of the part 520. These design considerations may be illustrated by referring back to FIG. 5. The multilayer composite material 410 may be a pre-form where the load requirements for the right side 424 are larger than the load requirements for the left side 426.

Referring again to FIG. 6, once the number of layers and fiber orientations are determined, a manufacturing control plan can be created 530 to manufacture the pre-form. The manufacturing control plan describes how the filament winding machine 310 will be operated in order to create the desired number of layers and fiber orientations. The manufacturing control plan may include rotational speed of the mandrel 316 with corresponding positions and speeds of the filament application section 320. This control plan may be a text plan for a machine operator or may be a computer program that interfaces with an automated filament winding machine 310.

Once the manufacturing control plan is established, the filament bands are wound on the mandrel 316 where the multiple layers and fiber orientations create the pre-form 540. The multilayer composite sheet 410 may then be cut into the shape of the part where it is ready to be applied to a form and cured.

It is envisioned in the present application, that an automated process for designing pre-forms may be established. The automated process may receive the design parameters for a component or part in a digital medium with associated load requirements, such as a finite element analysis program. A computer program may then determine the type of composite material, width of the filament band, and type of resin. Next, the number of layers of the composite material and the orientations of the layers may be established for the part.

The computer program may then determine a manufacturing control plan for interfacing with a filament winding machine to manufacture a pre-form. An automated process may then control the operational parameters of the filament winding machine. While any one of the steps could be replaced with a manual process, an automated process will generally be more efficient and cost effective.

The composite material described in this application may have multiple embodiments for manufacturing various composite parts. Generally, the composite material may be described as a plurality of layers of filament bands that are pre-impregnated with a solid or semi-solid resin at ambient temperatures. The different layers of filament bands have intersecting orientations relative to one another. The resin may provide an amount of tack allowing the composite material to easily be adhered to a form and to hold the multiple filament bands together.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A composite material comprising: a plurality of filament bands wound to define a composite sheet, wherein the individual bands are impregnated with a resin that is solid or semi-solid at ambient temperatures and becomes a viscous liquid to impregnate the filament bands when heated, the composite material having a plurality of layers of substantially parallel filament bands with an n number of first pairs of filament bands wherein the filament bands in each first pair have a same width w, are parallel to each other and are spaced apart from each other by a distance nw, and an N number of second pairs of filament bands, wherein the filament bands in each second pair have a same width W, are parallel to each other and are spaced apart from each other by a distance NW, wherein the first pairs of filament bands are parallel to each other and are oriented at a same angle $\alpha$ transverse to the second pairs of filament bands, and wherein each pair of filament bands is sequentially positioned for the composite sheet in numerical order, with n before N, wherein alternating layers have intersecting orientations with adjacent layers, such that the filament bands form a sheet of composite material.

2. The material as recited in claim 1 wherein the resin comprises an epoxy and hardener system.

3. The material as recited in claim 1 wherein the resin remains solid at temperatures up to about 120° F.

4. The material as recited in claim 1 wherein the resin becomes a liquid when heated at a temperature of about 160° F.

5. The material as recited in claim 1 wherein the composite sheet has sufficient drape and tack characteristics to allow the composite sheet to be formed into a selected shape.

6. The material as recited in claim 1 wherein the resin is a solid or semi-solid in the temperature range between about 50° F. to 110° F.

7. The material as recited in claim 1 wherein the resin cools to an uncured, solid or semi-solid state after the resin is heated to a viscous liquid state.

8. The material as recited in claim 1 wherein the material is produced by winding the filament bands on a mandrel.

9. The material as recited in claim 8, wherein the mandrel is a drum.

10. The material as recited in claim 1 wherein the sheet of composite material is substantially solid when cured.

11. A sheet of composite material comprising: a plurality of filament bands, wherein the individual filament bands are pre-impregnated with a two-component resin that is solid or semi-solid at ambient temperatures and becomes a viscous liquid when heated to impregnate the filament bands, the plurality of filament bands being wound into a sheet of composite material, with an n number of first pairs of filament bands wherein the filament bands in each first pair have a same width w, are parallel to each other and are spaced apart from each other by a distance nw, and an N number of second pairs of filament bands, wherein the filament bands in each second pair have a same width W, are parallel to each other and are spaced apart from each other by a distance NW, wherein the first pairs of filament bands are parallel to each other and are oriented at a same angle $\alpha$ transverse to the second pairs of filament bands, and wherein each pair of filament bands is sequentially positioned for the composite sheet in numerical order, with n before N, such that alternating layers of filament bands have an intersecting orientation with adjacent layers of filament bands to establish crimping sections between filament bands, and wherein the filament bands form a sheet of composite material that is substantially solid at ambient temperatures when uncured.

12. The sheet of composite material as recited in claim 11 wherein the resin comprises an epoxy and hardener system.

13. The sheet of composite material as recited in claim 11 wherein the resin remains solid at temperatures up to about 120° F. and becomes a liquid when heated at a temperature of about 160° F.

14. The sheet of composite material as recited in claim 11 wherein the composite sheet has sufficient drape and tack characteristics to allow the composite sheet to be formed into a selected shape.

15. The sheet of composite material as recited in claim 11 wherein the material is produced by winding the filament bands on a mandrel.

16. The sheet of composite material as recited in claim 11 wherein the sheet of composite material is substantially solid when cured.

17. The material as recited in claim 1 wherein n=N and w=W.

18. The material as recited in claim 1 wherein the angle $\alpha$ is in a range between 10° and 90°.

19. The sheet of composite material as recited in claim 11 wherein n=N and w=W.

20. The sheet of composite material as recited in claim 11 wherein the angle $\alpha$ is in a range between 10° and 90°.

* * * * *